L. F. NIENABER.
METHOD OF FASTENING CUSHION TIRES TO RIMS.
APPLICATION FILED AUG. 23, 1920.
1,391,846.
Patented Sept. 27, 1921.
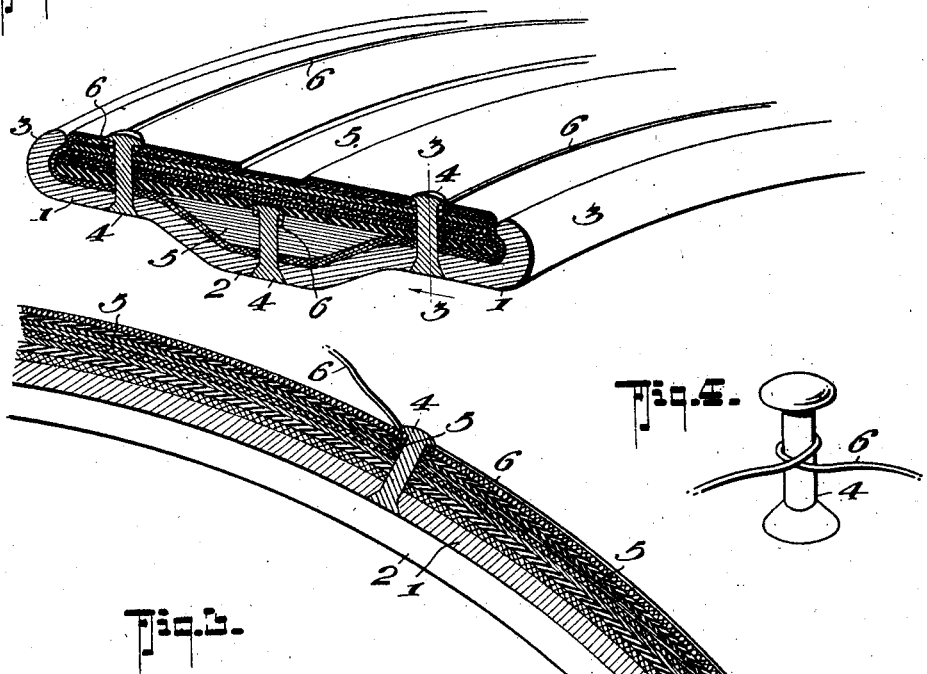
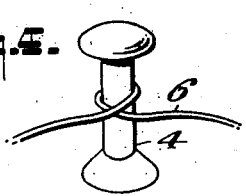
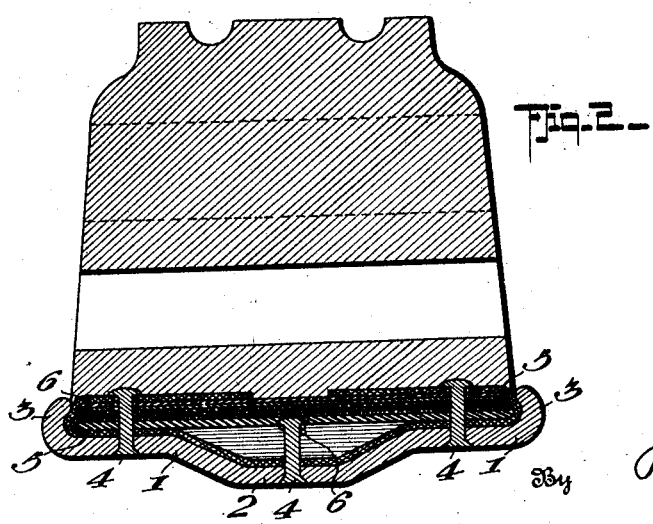
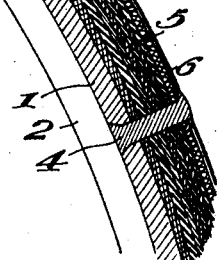
Inventor
L. F. Nienaber

UNITED STATES PATENT OFFICE.

LOUIS F. NIENABER, OF ST. PAUL, MINNESOTA, ASSIGNOR TO LAMBERT TIRE & RUBBER CO., INCORPORATED, OF AKRON, OHIO.

METHOD OF FASTENING CUSHION-TIRES TO RIMS.

1,391,846.  Specification of Letters Patent.  Patented Sept. 27, 1921.

Original application filed May 21, 1920, Serial No. 383,277. Divided and this application filed Aug. 23, 1920. Serial No. 405,262.

*To all whom it may concern:*

Be it known that I, LOUIS F. NIENABER, a citizen of the United States, at present residing at St. Paul, in the county of Ramsey and State of Minnesota, formerly residing at Akron, Ohio, have invented certain new and useful Improvements in Methods of Fastening Cushion-Tires to Rims, of which the following is a specification.

My invention relates to certain new and useful improvements in the manufacture of cushion tires. In manufacturing cushion tires it is the practice to build up the tire on a rim so that the tire and rim may be substituted on wheels now employing pneumatic tires without the necessity of changing the construction of the felly-band or the rim fastening devices.

In building up the tires on the rim difficulty has been found in securing the tire so tightly to the rim that it will not slip annularly under tractive force. It is to overcome this tendency of the tire to slip or creep on the rim that I have devised the method constituting the subject matter of this application. In carrying out my invention, I lay or build the base structure of the tire on the rim in the usual manner but before building up the superstructure of the tire I rivet the base structure to the rim at intervals and tie the base structure in place by annular wires wound around the same around the rivets, after which, the superstructure of the tire is built up and the entire mass vulcanized in the usual way, thus embedding the rivets and tie wires in the tire structure.

In the drawing,

Figure 1 is a sectional perspective view showing the base structure of the tire built up, the rivets and tie wires in place.

Fig. 2 is a cross section of the rim, with the complete tire structure on the same.

Fig. 3 is a detail vertical section on the line 3—3 of Fig. 1.

Fig. 4 is a detail perspective view illustrating the manner of wrapping the wire over the rivet head.

In the drawing, in which like numerals and letters of reference indicate like parts in all of the figures, the rim consists of the annular body portions 1—1 and the central depressed portion 2, the latter being of a lesser radius than that of the body portions 1—1 and adapted to conform closely to the felly band (not shown). The sides of the body portions 1—1 are curled over as at 3, to form tire retaining members. 4 designates a series of rivets which are fastened through the base structure 5 of the tire after it has been laid on the rim and 6 designates tie wires wound around the base structure under tension and looped around the rivets, thus effectually anchoring the base structure of the tire to the rim and preventing all tendency of creeping of the tire on the rim.

In building up the tires the base structure is built into the depressed portion 2 and the rivets for that portion are placed as indicated with the tie wires tied around the structure and around the rivets. After which, the second part of the base structure is put on and riveted down to the body portions 1—1 of the rim and tied with tie wires, as indicated. Following this, the superstructure is built up in the usual way and the entire mass placed in the vulcanizing kettle for vulcanization. Thus, when the tire is fastened the rivets and tie wires are wholly embedded within the tire structure.

Practice has demonstrated that this method of securing the tire to the rim is effectual and practical and results in the elimination of creeping and the tendency of the tire to become loose on the rim.

This application is a division of my application Serial No. 383,277 filed May 21, 1920, Patent No. 1,355,771, dated October 21, 1920.

From the foregoing description taken in connection with the accompanying drawing, it is thought that the manner of conducting my improved method and its advantages will be clear to those skilled in the art.

What I claim is:

1. The method of fastening cushion tires to rims which consists in building the base portion of the tire on the rim, fastening the base to the rim at intervals and tying the base by encircling members to the fastening means.

2. The method of fastening cushion tires to rims which consists in first riveting the base portions of the tire to the rim, tying the base portions by encircling wires to the rivets and subsequently building the superstructure of the tire on the base portion to embed the rivet heads and tie wires therein.

LOUIS F. NIENABER.